United States Patent [19]
Lemelson

[11] 4,165,960
[45] Aug. 28, 1979

[54] CONTINUOUS MOLDING APPARATUS

[76] Inventor: Jerome H. Lemelson, 85 Rector St., Metuchen, N.J. 08840

[21] Appl. No.: 813,795

[22] Filed: Jul. 8, 1977

Related U.S. Application Data

[63] Continuation-in-part of Ser. No. 744,505, Nov. 24, 1976.

[51] Int. Cl.$^2$ ............................................. B29F 1/022
[52] U.S. Cl. .................................... 425/145; 425/575; 425/588; 425/453; 425/DIG. 44
[58] Field of Search ....... 425/574, 575, 576, DIG. 44, 425/453, 145, 150, 371, 372, 327, 464, 382, 588; 264/40.1, 40.2, 328, 329; 222/52, 61; 141/94, 95, 177

[56] References Cited

U.S. PATENT DOCUMENTS

| | | | |
|---|---|---|---|
| 2,532,131 | 11/1950 | Van Voorst | 425/464 X |
| 3,557,404 | 1/1971 | Zippel et al. | 425/453 X |
| 4,050,873 | 9/1977 | Brumlik et al. | 425/DIG. 44 X |

FOREIGN PATENT DOCUMENTS

| | | | |
|---|---|---|---|
| 2125533 | 12/1971 | Fed. Rep. of Germany | 425/145 |
| 1380690 | 10/1964 | France | 425/574 |

*Primary Examiner*—Mark Rosenbaum

[57] ABSTRACT

A molding apparatus and method of molding or casting liquid resins and the like, are provided which includes flexible molding means. In one form, the mold is composed of two endless flexible belts, each of which is driven in an endless path with a portion of each belt driven parallel to a portion of the other belt and in contact therewith such that cavities formed in each belt come into alignment with each other when the belts make contact. Fast setting plastic liquid resin molding material is injected either at the side of or from the ends of the belts as they come together and flows into the cavities formed in the belts to continuously form a molded material or individual molded articles between the belts. After the molding material has solidified in the cavities between the belts, the belts are automatically driven apart and the molded articles removed from the cavities therebetween. In one form, removal of the molded articles is effected by a mechanical device or devices located at the exit end of the belts. In another form, a stationary scraping device or devices engages either or both belts and removes the molded articles therefrom. In yet another form, fluid under pressure is applied to the molded articles between the belts and blows or otherwise removes the articles therefrom. If the liquid is injected at temperature, the belts may be driven in a path through a tank of coolant liquid or fluid coolant material may be sprayed against the belts as they are driven.

9 Claims, 6 Drawing Figures

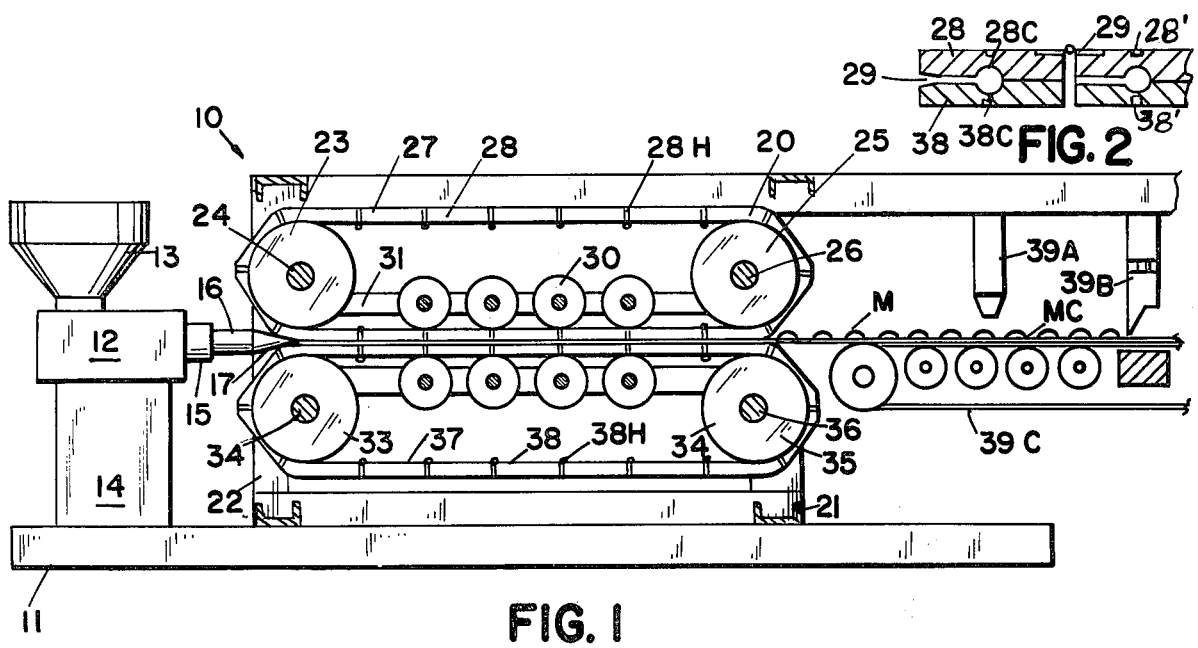
FIG. 1
FIG. 2
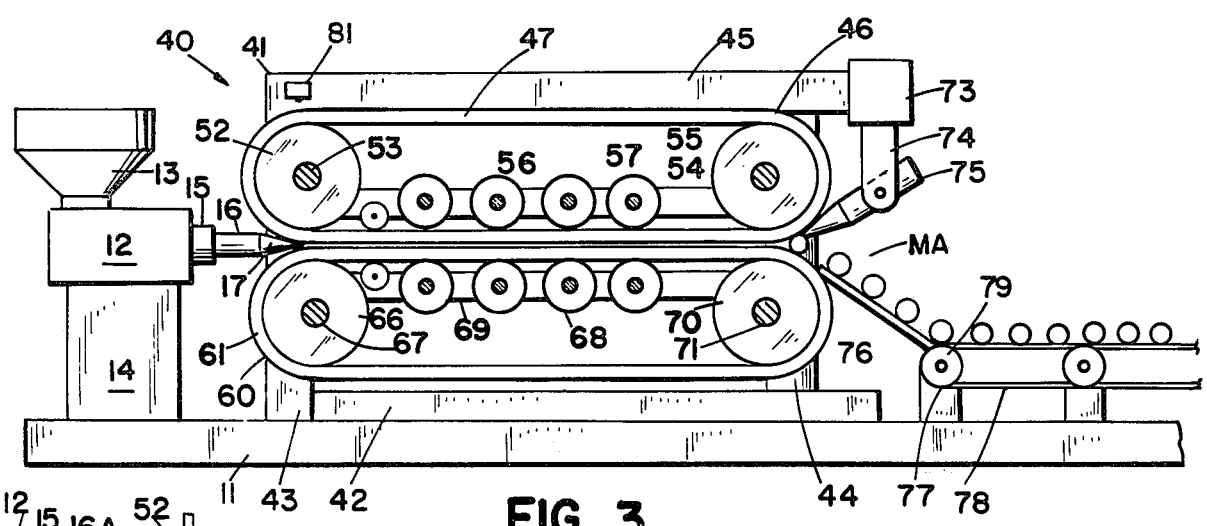
FIG. 3
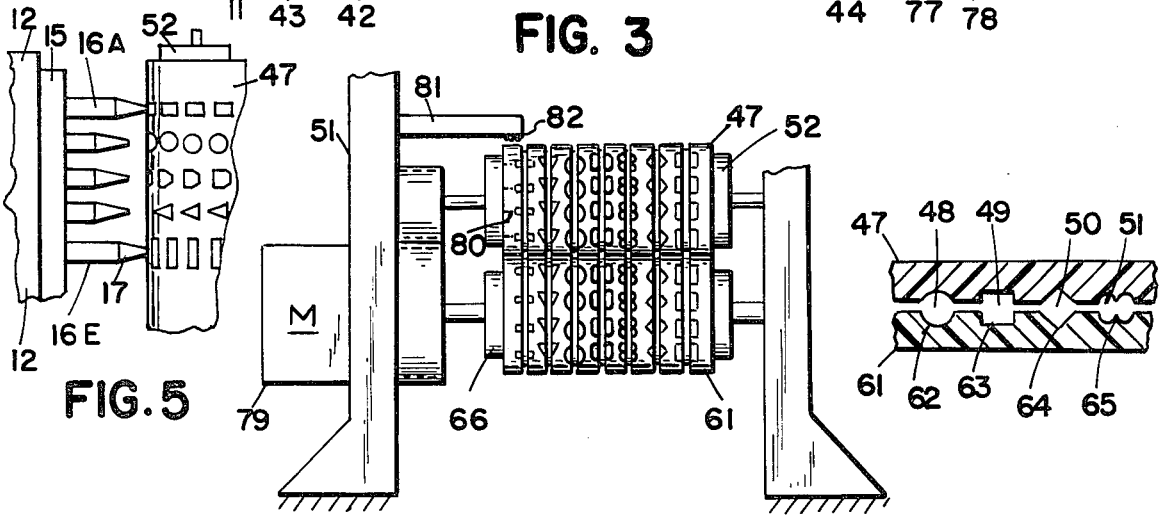
FIG. 5
FIG. 4
FIG. 6

CONTINUOUS MOLDING APPARATUS

RELATED APPLICATIONS

This is a continuation-in-part of application Ser. No. 744,505 filed Nov. 24, 1976 for Manufacturing Apparatus and Method.

SUMMARY OF THE INVENTION

This invention relates to improvements in casting or injection molding moldable materials such as fast setting one or multiple component plastic resins, low temperature metals and the like. In particular, the invention is concerned with an automatic molding system which employs a plurality of flexible members, such as thick belts made of durable rubber-like plastic resins, which are driven in endless paths around guide means and which engage each other during a portion of the path of travel thereof so as to define respective mold members between which liquid casting or molding materials may be made to flow and conform to aligned cavities formed in the surfaces of the belts. The injection means may be located at one end of the assembly where the endless belts come together and may be disposed to continuously or intermittently inject self-setting molding material between the belts so as to fill the aligned cavities thereof and to define either a continuous molding or a series of molded articles when the molding material has solidified thereafter. The apparatus and method permits the continuous production of a variety of shapes including elongated structural and sheet-like formations and individual articles at a rapid rate by means of an apparatus which is extremely simple in structure and does not suffer the shortcomings of conventional reciprocating injection molding machines. As a result, the cost of producing articles and materials is reduced as it may be performed rapidly and without the need for human labor.

Accordingly, it is a primary object of this invention to provide a new and improved apparatus and method for molding a variety of shapes including articles of various kinds, structural and other elongated materials.

Another object is to provide a new and improved apparatus and method for continuously molding individual articles of manufacture from plastic resins and the like.

Another object is to provide a new and improved apparatus for forming continuous moldings or castings of structural shapes and other materials.

Another object is to provide a molding apparatus in which articles or shapes are continuously molded or cast wherein the mold means comprises one or more flexible belt-like structures which are relatively low in cost.

Another object is to provide a continuous molding apparatus in which molding variables may be easily controlled so as to permit the molding of uniform parts and structures.

Another object is to provide a new and improved continuous casting system and method.

Another object is to provide a continuous casting or molding system employing flexible molds formed of endless belts having molding cavities therein with means for driving and compressing the belts together to seal the molding cavities.

Another object is to provide a molding apparatus employing continuous belt molding means and simple heat transfer means for transferring heat to or from the endless belt molds by passing same through a reservoir of heat transfer liquid.

Another object is to provide a continuously operable molding or casting system for articles including an endless array of mold sections having individual mold sections which may be easily replaced in said endless array with other mold sections.

Another object is to provide a single molding machine containing many different mold sections for molding a variety of different shapes, wherein the mold sections are arranged in belt-like arrays and are easily changed or replaced.

Another object is to provide a molding machine for plastic or metals having a multitude of different mold cavities for molding different shaped articles which cavities are continuously recycled past a plurality of injectors for molding material wherein the injectors may be selectively operated to inject molding material into only selected of the cavities to produce selected molded parts as needed.

Another object is to provide a multiple cavity molding machine containing a plurality of differnt cavities for shaping different articles therein wherein automatic control means such as a computer may be employed to control molding variables such as variations in the rate of flow of molding material to the different cavities in accordance with material requirements for each cavity.

With the above and such other objects in view as may hereafter more fully appear, the invention consists of the novel methods, constructions, combinations and arrangements of parts as will be more fully described and illustrated in the accompanying drawings but it is to understood that changes, variations and modifications may be resorted to which fall within the scope of the invention as claimed.

In the drawings:

FIG. 1 is a side view with parts broken away and sectioned for clarity of a continuous molding apparatus defined by two endless flight array of mold sections or mold section holders.

FIG. 3 is a side view tih parts removed for clarity of a modified form of the apparatus of FIG. 1, FIG. 2 is a side view in cross section of two of the molds of the apparatus of FIG. 1, FIG. 4 is an end view with parts removed and sectioned of the apparatus of FIG. 3, FIG. 5 is a plan view of part of the apparatus of FIG. 3, FIG. 6 is a partial view in cross section of the molds of FIGS. 3 to 5.

In FIGS. 1 and 2 is shown the first embodiment of the invention defining an automatic and continuous molding apparatus 10 comprising a base or support 11 which supports a mount 21 for a continuously operating belt molding machine and a support 14 for an extruder or injection molding machine 12 having a plurality of plastic injection heads 16 (denoted 16A–16E in FIG. 5) which may all be continuously, intermittently or selectively operated to inject or extrude predetermined quantities of settable plastic resinous material in a liquid or molten condition between the surfaces of cavities formed in two endless belts as illustrated in FIG. 2.

The injection molding machine 12 may be of any suitable construction and may operate by means of a screw, piston or a plurality of such devices for feeding molten or liquid molding material to a header 15 which supports the plurality of injection heads 16 in side-byside relationship across the width of the belts or conveyors defining the mold cavities. Each of the injection heads 16 may be collectively or separately power driven in a longitudinal direction to cause their nozzles or tip portions 17 to be intermittently or continuously forced during the molding operation between a plurality of hinged molds which are caused to converge together as two belt-like arrays thereof are driven in respective closed loop paths.

The mold carrying apparatus 21 includes a rectangular frame 22 formed of structural beams which support bearings (not shown) for the shafts 24 and 26 of a first pair of drums 23 and 25 and the shafts 34 and 36 for a second pair of drums 33 and 35. An endless array of hinged flight molds 27 are driven around the drums 23 and 25 in a path in which they are brought into engagement with aligned and matched molds 38 of a second endless array 37 of hinged molds driven around the drums 33 and 35 by a suitable motor or motors driving at least one of each of the pairs of drums. Each of the molds 28 contains at least one molding cavity 28C and each of the molds 38 contains a cavity 38C adapted to become aligned with the cavity 28C of the mating mold section of the other belt array 27 thereof, as illustrated in FIG. 2, when the belts are driven respectively counterclockwise and clockwise around drums 23 and 33. If a plurality of the mold cavities in each pair of mold sections 28 and 38 are formed laterally across the mold sections and are each accessible by means of a sprue or gate passageway 29 formed of extensions of either or both the cavities 28C and 38C, then each of such molding cavities may be accessible to nozzle 17 extending from one of the injection heads 16. If each of the injection heads 16 is separately movable and power driven by a separate motor or linear actuator supported within the header 15 into and out of engagement with the inlet to the gate passageway provided between the mold sections which are aligned therewith, then each of the nozzles may be advanced into engagement with its particular mold cavity inlet at the instant the aligned mold sections are compressively brought together between the drums 23 and 33 and a predetermined quantity of plastic resin or liquid metal may be injected through the nozzle head 17 of the injection head between the aligned mold sections to fill the molding cavity thereof and may be retracted to permit the aligned mold sections to be driven downstream of the molding position so as to bring the next pair of mold sections into alignment with each other for the next molding cycle. By separately driving each of the molding heads 16, molding material may be selectively injected into only selected of the molding cavities to the exclusion of others when it it desired to program the molding operation to provide selective control of the number and types of articles to be molded. In other words, as illustrated in FIGS. 4–6, the molding cavities of the apparatus of FIG. 1 may be varied in shape to produce different articles and may be selectively operated or filled depending on the types and numbers of articles to be molded.

Notation 30 refers to a plurality of free wheeling rollers rotatably supported on a subframe 31 which is supported by the frame 22 and disposed on both sides of the aligned molds 28 and 38 of the belt-like arrays 27 and 37 thereof. The free wheeling rolls 30 serve to compress and maintain the abutted molds together downstream of the location where injection of molding material therein is effected and for a sufficient time interval to permit the molding material to solidify in the cavities of the molds. Notations 28H and 38H refer to hinges disposed between and holding the molds 28 and 38 in the endless loop arrays 27 and 37 illustrated.

The drums 25 and 35 may be intermittently or continuously driven by controlled gear motor as illustrated in FIG. 4, to intermittently or continuously drive the endless belt-like array 27 of hinged mold sections 28 and the array 37 of hinged mold sections 38 to bring the matching mold sections of each intermittently or continuously into alignment with each other for molding shapes therebetween defined by the aligned mold cavity portions of each. The molded articles M are shown connected to each other by gate portions MC downstream of the mold conveying apparatus where they are disposed onto a belt conveyor 39C which is synchronized in its driven operation to the intermittent or continuous movement of the belt-like arrays 27 and 37 of mold sections.

Notation 13 refers to a hopper for supplying molding material to the injection molding machine 12 which molding material may also comprise a so called reaction injection molding material comprised or two or more liquid components such as a catalyst and resin, which are controlled in their flow through suitable pipes or ducting connected to the injection molding machine 12 through valves or pumps which are automatically controlled in their operation to effect proper molding.

Located beyond the mold component assemblies downsteam thereof are a plurality of tools supported by the overhead beam of the frame including one or more tools 39A for spray decorating, surface finishing or otherwise operating on the molded articles and one or more shear cutting tools 39B for severing the articles M from the connecting gate material MC.

FIG. 3 shows a modified form of the apparatus illustrated in FIG. 1 wherein the hinged arrays of mold components are replaced by respective endless flexible belts 47 and 61 wherein the former is driven in a counterclockwise direction around respective drums 52 and 54, and the latter is driven in clockwise direction around respective drums 66 and 70. The molding apparatus 40 includes, in addition to injection molding machine 12 having multiple injection heads 16 which are separately longitudinally movable or adjustable with respect to a support 15 therefor to permit the ends of the nozzles 17 of each injection head to be operatively connected to or uncoupled from respective lateral inlet portions and cavities formed in the belts as the belts are brought into abutment with each other. The shafts 53 and 67 of the drums 52 and 66 at the head end of the apparatus are respectively rotationally supported within bearings supported by front vertical members 43 of the frame 41 supporting the apparatus which frame includes a base 42 supported by the base 11 which supports the illustrated apparatus above the ground including the support 14 for the injection molding machine 12 and supports for a take-off conveyor 77 on which individually molded articles are disposed. An upper array of free wheeling rollers 56 are supported on a frame 57 which is secured to the main frame 41 and a lower group of rollers 68 are supported on the frame 69 also secured to the main frame 41. The rollers 56 and 68 respectively compress those portions of the belts 57 and 69 which abut each other together in a manner to prevent the outflow of molding material injected into the running cavities which are formed between the belts as illustrated in FIG. 6. Drums 54 and 70 located at the downstream end of the conveying belt assemblies are preferably driven by a single gear motor which is operatively connected by gears, a chain and sprocket or belt and pulling means (not shown) to the shafts 55 and 71 of the drums 54 and 70 and is supported by the frame vertical members 44.

Notation 46 refers to the entire conveyor assembly which includes the mold defining belt 47 while 60 refers to the entire conveyor including the mold defining belt 61. Each of the belts 47 and 61 may contain open cavities of the same or different shapes such as those illustrated in FIG. 6 which include semispherical cavities 48 and 62, open rectangular cavities 49 and 63, open prismatic or pyramidal cavities 50 and 64, irregular cavities of any suitable shape denoted 51 and 65, etc. Each cavity containing portion or longitudinal section of each belt may have cavities molded therein of the same shape as illustrated, for example, in FIG. 4, wherein if it is desired to mold a certain quantity of a particular shape of article or articles to the exclusion of all other articles, only that injection head of the group of heads 16 which is in alignment with the cavities defining the shapes of the desired articles, will be moved into alignment with those portions of the belts 47 and 61 which contain the cavities defining the desired moldings. In FIG. 5, only two of the injection heads 16A and 16E are shown in operative relation with the converging belts 47 and 61 while the remaining heads therebetween are retracted out of the way of the belts. Liquid or molten molding material may thus be continuously or intermittently injected through the nozzles of the heads 16 and 16E to form the articles defined by the cavities aligned with such nozzles as the belts are continuously or intermittently driven.

Two forms of injection operation are noted. In one, the end portions or nozzles 17 of the injection heads 16 are tapered and so shaped that the nozzles may continuously ride between the converging belts 47 and 61 and be compressively engaged thereby to effect a seal between the surfaces of the nozzles and the belts so that no backflow of molding material will be effected past the nozzle as the material is injected between the belts. In this mode of operation, the nozzles need never be retracted and it is only necessary to control the flow of molding material through the selected nozzle or nozzles aligned with the selected lateral portions of the belt containing the cavities defining the articles to be molded therebetween.

In the second mode of operation, the nozzles 17 are controllably projected and retracted each time a molding cavity comes into alignment with the end of the nozzle and is filled and moved beyond the nozzle a degree to permit the belt material beyond the cavities to seal off the cavities and retain freshly injected molding material therein. In the mode of operation where the nozzles 17 are continuously engaged between the belts 47 and 61, molding material may be continuously injected between the belts from the nozzles such that each cavity aligned with the nozzles and, if employed, each gate or sprue cavity portion is completely filled with molding material. Intermittent injection of molding material in this mode of operation may be employed to individually fill each cavity as it comes into alignment with the nozzle whereafter the belts are compressed together by the rollers 56 and 68 to prevent outflow of the molding material before it has solidified between the belts.

The overhead frame portion 45 of the main frame 41 is shown extending beyond the end of the belts 47 and 61 and supports a manipulator 73 containing an arm 74 and one or more power operated devices 75 which may operate in synchronization with the movement of the belts 47 and 61 to perform one or more of such functions as to sever the articles MA from the gate portions of the molding, if such gate portions are present, or remove the articles from between the belts as the belts separate and dispose such articles onto a chute 76 down which they slide onto a belt 78 forming part of a belt conveyor 77 conveying said articles away from the molding apparatus.

In yet another mode of operation, it is noted that the individual cavities of the belts 47 and 61 of the apparatus of FIG. 3 or those defined in the mold sections 28 and 38 of the apparatus of FIG. 1, need not all be the same in configuration along a particular longitudinal portion of the belts but may define differently shaped articles wherein a particular number of any selected article may be injection molded to shape by continuously or intermittently driving the belts, as described, and controllably injecting molding material through the injection head or heads 16 aligned with those portions of the belts or mold sections containing the cavities defining the desired articles when such cavities come into operative alignment with each other and the injection head aligned therewith.

If the cavities differ in shape from one longitudinal molding position of the belts to another, it would be necessary to indicate which cavity position is in alignment with the injection heads at any particular instant, and one way of effecting such control is to provide marker or code recording along a border of one of the belts and scanning such recording photoelectrically. In FIG. 4, binary codes 80 are printed or otherwise recorded along a border of the belt 47, each of which is indicative of a particular molding position or lateral aligned array of mold cavities formed in the surface of the belt. These codes may be in the form of marks or strips of electro-optically scannable printed matter such as a bar or strip code extending completely around the belt which is scanned by a bank of photoelectric cells 82 supported on an arm 81 extending from the frame 51. The output code signals generated when the photoelectric cells of the bank 82 thereof scans the codes 80 are transmitted to a comparator circuit which varies in the code to be compared in accordance with signals received thereby from a computer or memory which has been programmed with the longitudinal belt positions or cavities located thereat which are desired to be filled with plastic. In other words, when each lateral array of cavities in which one or more cavities thereof is desired to be utilized to form a molded article or articles is driven into the molding position, a corresponding code scanned by the bank of cells 82 comes into alignment with said cells and the signals generated thereby are utilized by means of a comparator circuit which has been programmed to generate an output signal when the particular code scanned is received thereby wherein the output signal is employed per se or in accordance with suitable computing circuits for controlling the injection of molding material into the cavity or cavities formed between the belts 47 and 61 which are shaped to define the molded article or articles required to be molded.

In another mode of operation, all the cavities in a lateral row or a number of lateral rows of the belts 47 and 61 define the same shaped article, all of the injection heads 16 may be simultaneously operated to inject predetermined amounts of molding material into the molding cavities of the belts aligned therewith, and it will not be necessary to controllably flow molding material through selected of the injection heads 16.

It is, of course, noted that the cavities of any particular longitudinal row thereof may vary in shape from one to the other as well as the cavities in any particular lateral row may so vary wherein hundreds of differently shaped articles may be molded by controllably flowing molding material through any selected injection head of the bank of said heads illustrated in FIG. 5 in accordance with the particular longitudinal location of the cavities with respect to the injection heads. In any of these modes of operation wherein differently shaped cavities are provided and molding material is intermittently injected into each cavity, a master controller or computer containing a memory from which signals may be generated which are indicative of the quantities of molding material required for each cavity, may be employed not only to selectively control the injection of molding material into selected of the cavities but also to control a valve or pump associated with each injection head to flow a proper amount of molding material into each article defining cavity when the particular cavity locations of each of the belts are in operative location with respect to the nozzle or nozzles of the injection heads aligned therewith.

In yet another form of the invention illustrated in FIG. 1, it is noted that each of the mold sections 28 and 38 of the belts 27 and 37 may be defined by a respective hinged flight and retainer for a mold insert or a group of such inserts which are easily removed and replaced with other inserts to account for mold wear, provide for mold maintenance or merely to interchange cavities to provide differently shaped cavities at each of the mold defining flight locations.

In another form of mold construction, belts 47 and 61 of the embodiment illustrated in FIG. 3 may be shaped and constructed to retain a plurality of mold cavity defining portions or inserts at selected longitudinal and/or lateral locations of the belts which are defined by holes or inserts secured to the belts for receiving fasteners or projections from the mold cavity inserts for fastening same to the belts.

It is particularly noted that if the belts 47 and 61 of the embodiment of FIGS. 3-6 are shaped with cavities or contain mold inserts defining all or a substantial number of articles required to be manufactured in different quantities and at different times in a manufacturing operation, then by selectively programming the apparatus to effect operative coupling between selected of the injection heads 16 and the molding locations therefor and to inject predetermined quantities of molding material from the nozzles thereof into selected of the molding cavities any number of any of the articles which are possible to injection mold in the cavities or inserts provided in the belts 47 and 61 may be manufactured as they are needed. If a programmable programmer, such as a digital computer, is employed to control the molding operation, it may receive its command inputs from a remote location such as the output of a terminal or terminals provided, for example, at a production control or purchasing department or the output of a computer or scanning device associated with a production machine, such as an assembly machine, or machine producing other elements of articles of manufacture such that the exact numbers of articles to be produced by means of the single injection molding apparatus may be controllably produced when needed, without effecting an overproduction of articles. In the apparatus illustrated in FIGS. 1 and 3, the overhead portion of the frame supporting the arrays of mold sections, such as the downstream extending section of FIG. 1, may also contain and support one or more inspection devices, such as photo-optical or other forms of sensing devices which may be operated per se or under computer control to count and inspect molded articles moving therepast on the outflow conveyor. In addition, further means may be employed to automatically remove articles from the downstream conveyor which do not conform to a desired quality or diminsions as determined by the automatic inspection means. Notation 39A may therefore define an electrooptical or other form of automatic inspection scanner or sensor disposed immediately above the articles flowing therebeneath on the conveyor 39C.

In the molding apparatus shown in FIGS. 1 and 2 alignment of the two flexible belts 27 and 37, to always provide the open molding cavities 28C and 38C of each of the matching pairs of molds in alignment with each other as they come together and are compressed between the rolls 30, is effected by providing the drums 23,33 and 25,34 with sprocket teeth which either engage between the hinged arrays of flights or mold sections or engage cavities 28' and 38' formed therein during the driving and guidance of the belts along their respective paths. Similarly, the belts 47 and 61 of FIGS. 3. and 4 may have their inside surfaces formed with cavities or holes into which the sprockets or teeth of the sprocketed drums 52,66 and 55,70 are driven or engage in when passing over and around the drums.

In the embodiment shown in FIG. 1 the molded parts M formed in the molding cavities defined by the engaged belts are shown attached together as they come from between the belts by connecting material or gate portions MC formed by the continuous injection of molding material between the belts into the cavities and continuous sprue or gate forming cavities extending therebetween an arrangement which would require that the flights sealingly engage each other along the section compressed together by rolls 30. Such gate forming material MC may be provided by providing channels between the cavities formed in the belts 47 and 61 of the apparatus of FIG. 3.

Modifications to the dual flexible belt molding apparatus described are noted as follows:

I. The two closed loop flexible belt members between which molding material is continuously or intermittently injected may be replaced by a single flexible belt made of a plastic resin of the type described and a stainless steel flexible belt having a smooth surface which is compressed against the molding cavity containing surface of the flexible belt.

II. Two metal belts such as stainless steel sheets, at least one of which contains molding cavities formed therein by deformation of the metal sheet or by welding metal mold sections across openings in the belts may also be utilized as the mold.

III. Either or both belt members defining the mold may comprise a hinged array of separate flights or molds, each of which flights contains a flexible mold pad secured thereto with each mold pad having a molding cavity formed therein wherein the molding cavities of each pad are adapted to become aligned with respective cavities in a pad or portion of the other belt as the two belts are driven together so as to form separate molding cavities into which predetermined quantities of liquid or molten molding material may be intermittently injected. In other words, the molding machine may comprise two flight conveyors each containing separate flexible mold sections or a flight conveyor containing separate flexible sections and a flexible resilient or stainless steel belt of the type described.

IV. The dual flexible belts or any other form of dual mold composed of two flexible pads or belts which are compressed together to effect sealing, may form mold members containing a molding cavity provided therebetween, into which molding cavity liquid molding material may be injected by means of an injection nozzle formed with a tapered tip end which is forced between the two pads which are compressed together in such a manner as to effect a pressure seal between the surface of the injection nozzle and the resilient material of the two pads to permit injection of liquid molding material to be effected between the pads under pressure without leakage. In other words, flexible molding belts of the type described, when compressed together as described, may have liquid molding material injected therebetween from the front end or the sides of the compressed belts by means of a suitable injection needle or nozzle inserted between the compressed belts at the interface thereof.

I claim:

1. An apparatus for continuously molding comprising in combination:
   a first endless flexible belt defining a first mold member containing a plurality of molding cavities formed in a major surface thereof and shaped for forming separate articles in each cavity,
   means operatively associated with said first belt member for guiding and driving said first belt member in an endless path,
   a second endless flexible belt member defining a second mold member,
   means for guiding and driving said second endless flexible belt member in an endless path which extends so as to cause said second belt member to be driven closely adjacent and parallel to a portion of said first flexible belt member, and
   means for compressively engaging said first and second belt members together along portions thereof which extend parallel to each other,
   injection means for a liquid molding material,
   means for intermittently operating said injection means,
   means for supporting said injection means at a location to permit it to intermittently inject its molding material between said first and second flexible belt members to fill said cavities as said flexible belt members are brought together, and
   means for intermittently feeding and ejecting said liquid molding material from said injection means in synchronization with the driving movement of said first and second endless flexible belts in a manner to cause said molding material to fill each of the cavities formed between said first and second flexible belt members after said belt members are driven together,
   said molding material being operable to solidify within said cavities between said first and second belt members, and
   means for removing the moldings from between said flexible belt members beyond the path locations of said belt members where they are driven together to provide a plurality of moldings thereof formed between said flexible belt members.

2. A molding apparatus in accordance with claim 1 in which at least one of said flexible belt members is formed at least in part of a flexible plastic resin.

3. A molding apparatus in accordance with claim 2 in which the flexible belt members containing the cavities formed therein have the cavities defined by respective molded portions of said flexible belt members.

4. A molding apparatus in accordance with claim 1 wherein said injection means comprises an injection nozzle disposed between said first and second flexible belt members where they come together and is compressed between each of said flexible belt members in a manner to effect a seal therebetween and to prevent the leakage of liquid molding material beyond said flexible belt members so that said liquid molding material is injected only into the cavities defined between said flexible belt members.

5. A molding apparatus in accordance with claim 4 including means for reciprocally moving said injection nozzle to intermittently seal the end portion thereof between said flexible belt members and means for intermittently injecting liquid molding material between said flexible belt members each time a molding cavity comes into alignment with the end of said nozzle.

6. A molding apparatus in accordance with claim 5 wherein each of said flexible belt members contains respective portions of a plurality of molding cavities formed in its surface and means for aligning said flexible belt members and driving same along said guide means in a manner to bring the respective cavities formed in each of said flexible belt members into alignment with each other along the respective paths of travel of said belt members which extend parallel to each other so that each of said flexible belt members define respective portions of the molding cavities into which said molding material is injected.

7. A molding apparatus in accordance with claim 5 including means for controlling movement of said injection means and the ejection of liquid molding material therefrom to cause it to fill only selected of said molding cavities formed by said endless belts as they come together.

8. A molding apparatus in accordance with claim 7 wherein said means controlling movement of said injection means includes means for generating feedback signals indicative of the positions of said molding cavities, comparator means for receiving said signals and means for programming said comparator means to cause it to generate a control signal each time a feedback signal is received thereby which is indicative that a selected cavity is aligned with said injection means.

9. A molding apparatus in accordance with claim 8 including a memory means containing recordings indicative of selected of said cavities and of the molding material required to fill each of said selected cavities, and further means operatively connected to said memory means for controlling the flow of molding material from said injection means, said memory means being operable to generate signals when selected of said recordings are reproduced therefrom when respective of said cavities are aligned with said memory means so as to provide proper amounts of molding material flowed from said injection means to fill the selected cavities.

* * * * *